(12) United States Patent
Watanabe

(10) Patent No.: US 6,947,746 B2
(45) Date of Patent: Sep. 20, 2005

(54) MOBILE COMMUNICATIONS SYSTEM, MOBILE STATION, CONTROL METHOD AND RECORDING MEDIUM

(75) Inventor: Akira Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 417 days.

(21) Appl. No.: 10/227,476

(22) Filed: Aug. 26, 2002

(65) Prior Publication Data

US 2003/0045291 A1 Mar. 6, 2003

(30) Foreign Application Priority Data

Aug. 29, 2001 (JP) ........................................ 2001-258902

(51) Int. Cl.[7] .............................................. H04Q 7/20
(52) U.S. Cl. ...................... 455/438; 455/436; 455/437; 455/442; 455/435.1
(58) Field of Search ............................... 455/436–439, 455/435.1, 442

(56) References Cited

U.S. PATENT DOCUMENTS

| | | | | |
|---|---|---|---|---|
| 4,955,082 A | * | 9/1990 | Hattori et al. ............... | 455/440 |
| 5,018,187 A | * | 5/1991 | Marinho et al. ............ | 455/439 |
| 5,065,423 A | * | 11/1991 | Gaskill ....................... | 340/7.41 |
| 5,212,822 A | * | 5/1993 | Fukumine et al. ........ | 455/435.3 |
| 5,267,261 A | * | 11/1993 | Blakeney, II et al. ....... | 370/332 |
| 5,305,466 A | * | 4/1994 | Taketsugu ................. | 455/435.1 |
| 5,343,512 A | * | 8/1994 | Wang et al. ................. | 455/410 |
| 5,483,664 A | * | 1/1996 | Moritz et al. ............... | 455/428 |
| 5,491,717 A | * | 2/1996 | Hall ............................ | 370/332 |
| 5,548,816 A | * | 8/1996 | DeVaney .................. | 455/456.2 |
| 5,621,784 A | * | 4/1997 | Tiedemann et al. ....... | 455/435.1 |
| 5,666,652 A | * | 9/1997 | Lin et al. .................... | 455/435.1 |
| 5,678,184 A | * | 10/1997 | Cutler et al. ................. | 455/436 |
| 5,790,073 A | * | 8/1998 | Tayloe et al. .......... | 342/357.16 |
| 5,790,954 A | * | 8/1998 | Tayloe et al. ............... | 455/437 |
| 5,842,128 A | * | 11/1998 | Kito et al. ............... | 455/435.1 |
| 5,898,923 A | * | 4/1999 | Gaasvik et al. ............. | 455/434 |
| 5,950,130 A | * | 9/1999 | Coursey ................... | 455/432.1 |
| 6,075,990 A | * | 6/2000 | Shin ........................... | 455/440 |
| 6,138,021 A | * | 10/2000 | Arrington et al. .......... | 455/436 |
| 6,178,164 B1 | * | 1/2001 | Wang et al. ................. | 370/331 |
| 6,181,942 B1 | * | 1/2001 | Krishnamurthi ............ | 455/436 |
| 6,188,900 B1 | * | 2/2001 | Ruiz et al. ................... | 455/436 |
| 6,240,291 B1 | * | 5/2001 | Narasimhan et al. ....... | 455/436 |
| 6,337,983 B1 | * | 1/2002 | Bonta et al. ................ | 455/437 |
| 6,356,755 B1 | * | 3/2002 | Valentine et al. ........ | 455/435.1 |
| 6,363,255 B1 | * | 3/2002 | Kuwahara ................ | 455/456.5 |
| 6,393,279 B1 | * | 5/2002 | Lee .......................... | 455/426.1 |
| 6,434,390 B2 | * | 8/2002 | Rahman ..................... | 455/440 |
| 6,571,096 B2 | * | 5/2003 | Plunkett ..................... | 455/436 |
| 2003/0008656 A1 | * | 1/2003 | Yamashita et al. .......... | 455/450 |
| 2004/0229617 A1 | * | 11/2004 | Sato ........................... | 455/437 |
| 2005/0003820 A1 | * | 1/2005 | Ozluturk ..................... | 455/436 |

FOREIGN PATENT DOCUMENTS

| | | | |
|---|---|---|---|
| JP | 11-69421 | | 3/1999 |
| WO | WO 94/16529 | * | 7/1994 |

OTHER PUBLICATIONS

United Kingdom Combined Search Report and Examination Report dated Feb. 27, 2003.
United Kingdom Combined Search Report and Examinatin Report dated Feb. 6, 2004.

* cited by examiner

*Primary Examiner*—William Trost
*Assistant Examiner*—Sharad Rampuria
(74) *Attorney, Agent, or Firm*—McGinn & Gibb, PLLC

(57) ABSTRACT

A mobile station that can suppress repetitive location registration. If a cell reselection instruction is issued for a cell, the mobile Station determines whether the new cell is listed in a history of cells in which the mobile station has existed before. If the new cell lies in the history, the control circuit suppresses the transfer. If a count value of cell reselection instructions in the mobile station reaches a predetermined value, the control circuit performs the transfer without referring to the history. In this manner, repetitive zone transfers are suppressed, so that the location registration process is also suppressed, and so the repetition of location registration can be suppressed.

52 Claims, 8 Drawing Sheets

MOBILE COMMUNICATIONS SYSTEM, MOBILE STATION, CONTROL METHOD AND RECORDING MEDIUM

BACKGROUND OF THE INVENTION

1. Field of the Invention

The present invention relates to a mobile communications system, a mobile station, a control method and a recording medium and, more particularly, to a mobile communications system for code division multiple access, comprising a mobile station and base stations.

2. Description of the Prior Art

In the conventional mobile communications system, Location Areas (LAs) are preset. When the location of a User Equipment (UE) that is a mobile station is registered, the location registration information indicating the LA where the UE resides is recorded in a database system called a Home Memory (HM) station. The UE registers the location upon moving from one LA to another LA, and the location registration information in the HM station is updated, whereby no matter where the UE is moved, the location of the UE can be retrieved at any time according to the HM station.

Accordingly, when controlling an incoming call to the UE, referring to the location registration information of the UE that is written in the HM station, incoming call signals are transmitted from all the Base Transceiver Stations (BTSs) within the LA in which the UE exists.

In the conventional mobile communications system, the UE judges the zone (cell) in which the UE exists by measuring a reception level of a control signal received from the BTS forming this zone. FIG. 8 is a diagram for explaining a method for judging the zone. In FIG. 8, the UE measures a electric field strength of the control signal received from the BTS constituting the cell in which the UE exists at present. The UE does not perform a zone transfer processing, if the measured electric field strength is maintained above a threshold value (Pth[dB]) for a predetermined time period (Tselection [sec]). However, the UE performs the zone transfer processing, if the measured electric field strength falls below the threshold value by a predetermined number of times for the time period of Tselection. The zone transfer processing is a cell switching processing, and contains a location registration processing.

If the UE is located in the boundary between LAs, and field strengths of received control signals around the boundary are intermingled, the UE repeats the location registration consecutively. Therefore, a traffic in the location registration is increased.

SUMMARY OF THE INVENTION

It is an object of the present invention to provide a mobile communications system, a mobile station, a control method and a recording medium in which it is possible to suppress a repetition of location registration due to a movement of a mobile station in adjacent regions of location areas or a change in the radio wave propagation environments.

The present invention provides a mobile communications system for code division multiple access, comprising a mobile station and base stations, wherein the mobile station comprises suppression control means for suppressing a transfer processing for transferring to a transferred cell to be selected in the transfer processing in accordance with a history indicating cells in which the mobile station has existed before, when a cell selection instruction is issued.

In the mobile communications system, the suppression control means suppresses the transfer processing, if the transferred cell lies in the history.

Also, in the mobile communications system, the suppression control means performs the transfer processing, if the cell selection instruction is issued by a predetermined number of times.

This invention provides a mobile communications system for code division multiple access, comprising a mobile station and base stations, wherein the mobile station comprises suppression control means for suppressing a transfer processing for transferring to a transferred cell to be selected in the transfer processing in accordance with the number of issuing the cell selection instruction within a predetermined time period and a history indicating cells in which the mobile station has existed before.

This invention provides a mobile station in a mobile communications system for code division multiple access, comprising the mobile station and base stations, the mobile station comprises suppression control means for suppressing a transfer processing for transferring to a transferred cell to be selected in the transfer processing in accordance with a history of cells in which the mobile station has existed before, when a cell selection instruction is issued.

This invention also provides a mobile station in a mobile communications system for code division multiple access, comprising the mobile station and base stations, the mobile station comprises suppression control means for suppressing a transfer processing for transferring to a transferred cell to be selected in the transfer processing in accordance with the number of issuing the cell selection instruction within a predetermined time period and a history of cells in which the mobile station has existed before.

This invention provides a control method for a mobile station in a mobile communications system for code division multiple access, comprising the mobile station and base stations, the method comprising a suppression control step for suppressing a transfer processing for transferring to a transferred cell to be selected in the transfer processing in accordance with a history of cells in which the mobile station has existed before, when a cell selection instruction is issued.

This invention also provides a control method for a mobile station in a mobile communications system for code division multiple access, comprising the mobile station and base stations, the method comprises a suppression control step for suppressing a transfer processing for transferring to a transferred cell to be selected in the transfer processing in accordance with the number of issuing the cell selection instruction within a predetermined time period and a history of cells in which the mobile station has existed before.

This invention provides a recording medium for recording a program that is executed on a computer to implement a control method for a mobile station in a mobile communications system for code division multiple access, comprising the mobile station and base stations, the program comprising a suppression control step for suppressing a transfer processing for transferring to a transferred cell to be selected in the transfer processing in accordance with a history of cells in which the mobile station has existed before, when a cell selection instruction is issued.

This invention also provides a recording medium for recording a program that is executed on a computer to implement a control method for a mobile station in a mobile communications system for code division multiple access, comprising the mobile station and base stations, the program comprises a suppression control step for suppressing a transfer processing for transferring to a transferred cell to be selected in the transfer processing in accordance with the number of issuing the cell selection instruction within a predetermined time period and a history of cells in which the mobile station has existed before.

The operation of this invention will be described below. The suppression control means for the mobile station suppresses the transfer processing from the cell in which the mobile station exists at present to the transferred cell by referring to the history indicating cells in which the mobile station has existed before in response to a cell selection instruction. More specifically, if the transferred cell lies in the history, the transfer processing is suppressed. Also, if the cell selection instruction is issued by a predetermined number of times, the transfer processing is performed, irrespective of whether or not the transferred cell lies in the history. Further, a time parameter is added, and the transfer processing is suppressed based on the number of issuing the cell selection instruction with a predetermined time, and the history. Furthermore, the predetermined number of times and the predetermined time are set up in accordance with the frequency of the cell selection instruction. Therefore, the transfer processing is effectively suppressed, so that the location registration processing that is performed when the LA in which the mobile station exists is changed by the transfer processing is also suppressed.

DESCRIPTION OF THE PREFERRED EMBODIMENTS

Figure 1:
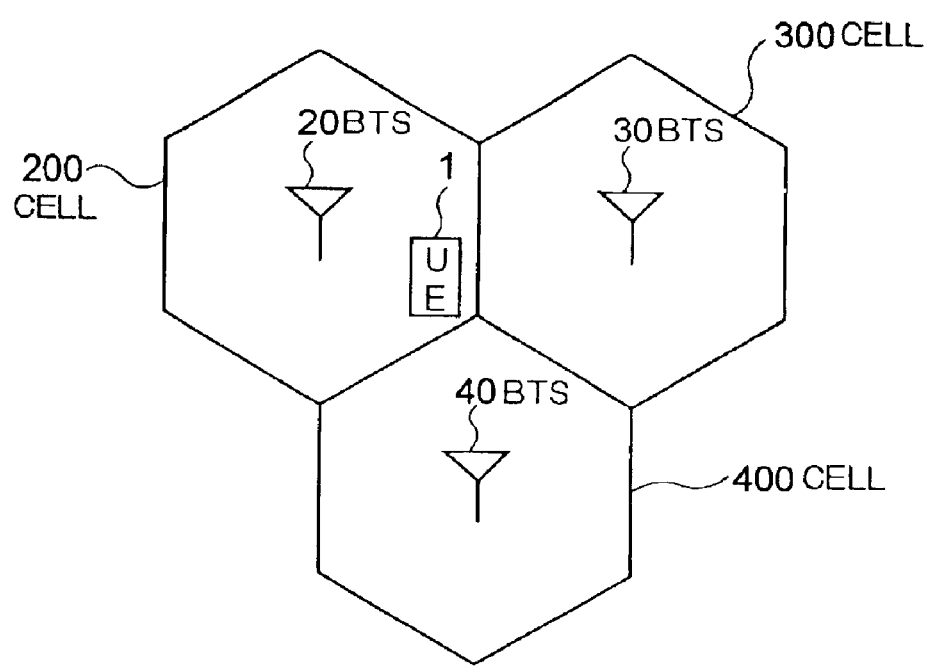
FIG. 1 is a diagram showing the configuration of a mobile communications system according to an embodiment of the present invention.

The preferred embodiments of the present invention will be described below with reference to the accompanying drawings. FIG. 1 is a diagram showing the configuration of a mobile communications system according to an embodiment of the invention. In FIG. 1, the mobile communications system according to the embodiment of the invention adopts a Code Division Multiple Access (CDMA) mode, and comprises a User Equipment (UE) 1 and Base Transceiver Stations (BTSs) 20, 30 and 40. Herein, a cell formed by the BTS 20 is denoted by numeral 200, a cell formed by the BTS 30 is denoted by numeral 300, and a cell formed by the BTS 40 is denoted by numeral 400. The UE 1 resides within the cell 200. When the UE 1 exists near the boundary of the cell 200 which adjoins the cells 300 and 400, it can receive control signals from the BTSs 20, 30 and 40 at the same time. In the case where the BTS is sectored employing a plurality of directional antennas, each sector is referred to as a cell.

Figure 2:
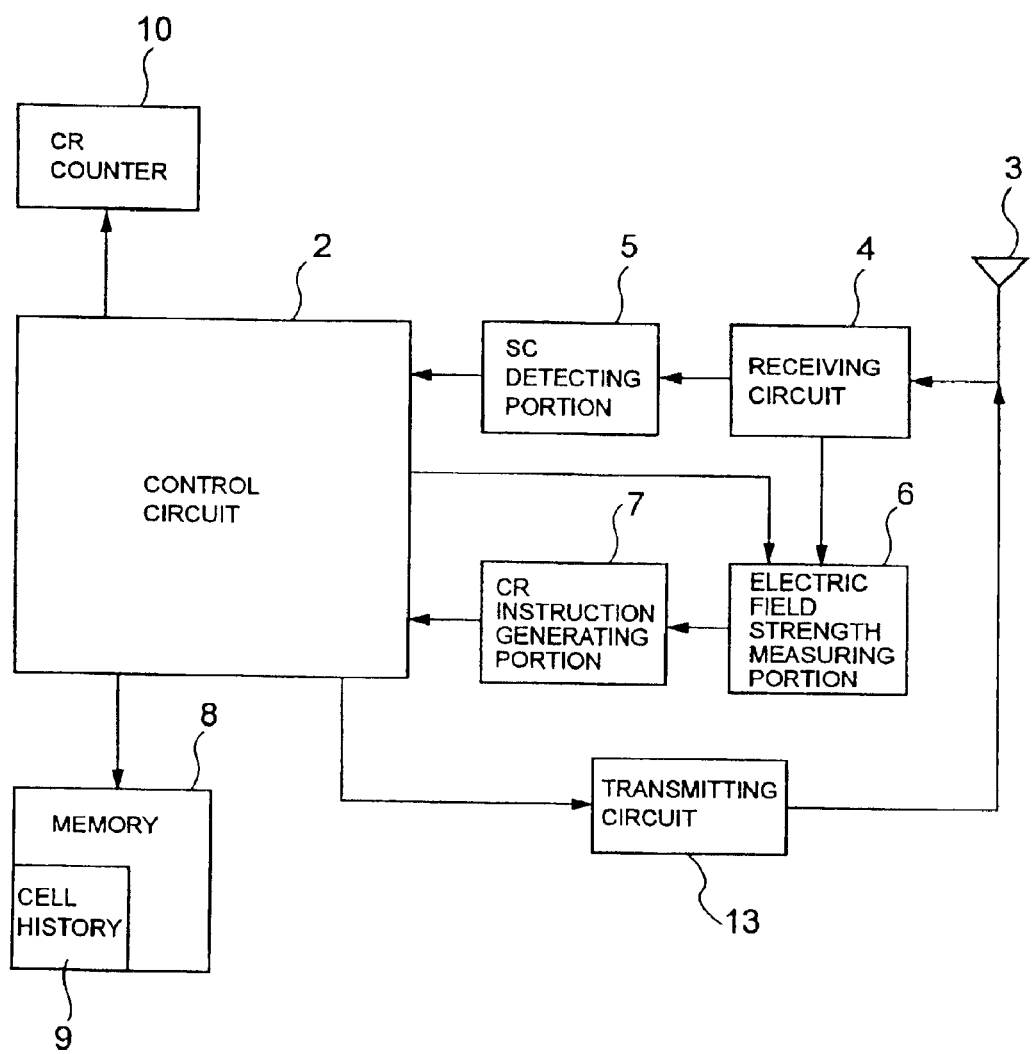
FIG. 2 is a functional block diagram showing the configuration of a user equipment according to a first embodiment of the invention.

FIG. 2 is a functional block diagram showing the configuration of a User Equipment according to a first embodiment of the invention. The User Equipment as shown in FIG. 2 is employed in the mobile communications system as shown in FIG. 1, and it is the UE 1 as shown in FIG. 1.

In FIG. 2, the UE 1 comprises a control circuit 2, an antenna 3, a receiving circuit 4, an Scrambling Code (SC) detecting portion 5, an electric field strength measuring portion 6, a Cell Reselection (CR) instruction generating portion 7, a memory 8, a CR counter 10, and a transmitting circuit 13.

The antenna 3 serves to transmit or receive radio wave to or from at least one of the BTSs 20, 30 and 40 as shown in FIG. 1. The receiving circuit 4 performs a predetermined process for a signal received through the antenna 3 and outputs the signal to the SC detecting portion 5 and the electric field strength measuring portion 6. The transmitting circuit 13 is for transmitting a radio signal to BTS via the antenna 3. The SC detecting portion 5 detects an SC of a Primary-Common Pilot Channel (P-CPICH) for identifying a cell based on the received signal from the receiving circuit 4 and outputs the SC to the control circuit 2.

Figure 8:
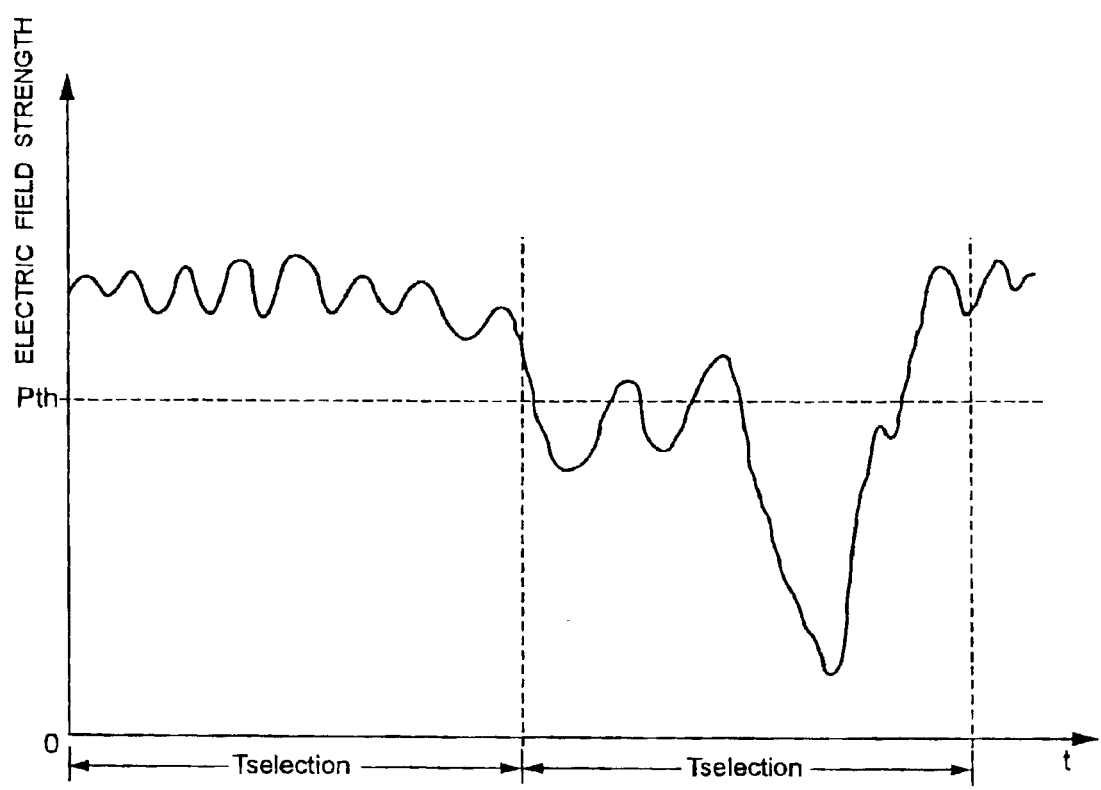
FIG. 8 is a diagram for explaining a judgement method for a zone in which a user equipment exists.

The electric field strength measuring portion 6 measures the level of a received signal from the BTS forming a cell in which the UE 1 exists, and outputs the measured result to the CR instruction generating portion 7. That is, the electric field strength measuring portion 6 demodulates the received signal from the receiving circuit 4 by using the SC indicating the cell in which the UE 1 exists at present and notified from the control circuit 2, and then measures its electric field strength. The CR instruction generating portion 7 monitors the measured result of the electric field strength measuring portion 6. The CR instruction generating portion 7 recognizes that the reception condition of radio wave from the BTS forming the cell in which the UE 1 exists at present is deteriorated, if the measured result falls below a threshold value (Pth[dB]) by a predetermined number of times for a predetermined time period (Tselection [sec]), as shown in FIG. 8. The CR instruction generating portion 7 that has detected a deterioration in the reception condition generates a CR instruction for output to the control circuit 2.

The memory 8 holds a history 9 of the cell where the UE 1 has resided before. When a zone transfer processing is performed, the SC indicating the cell to which the UE 1 has transferred through the zone transfer processing is written in the cell history 9 by the control circuit 2. The zone transfer processing is a cell switching processing, and contains a location registration processing.

Figure 3:
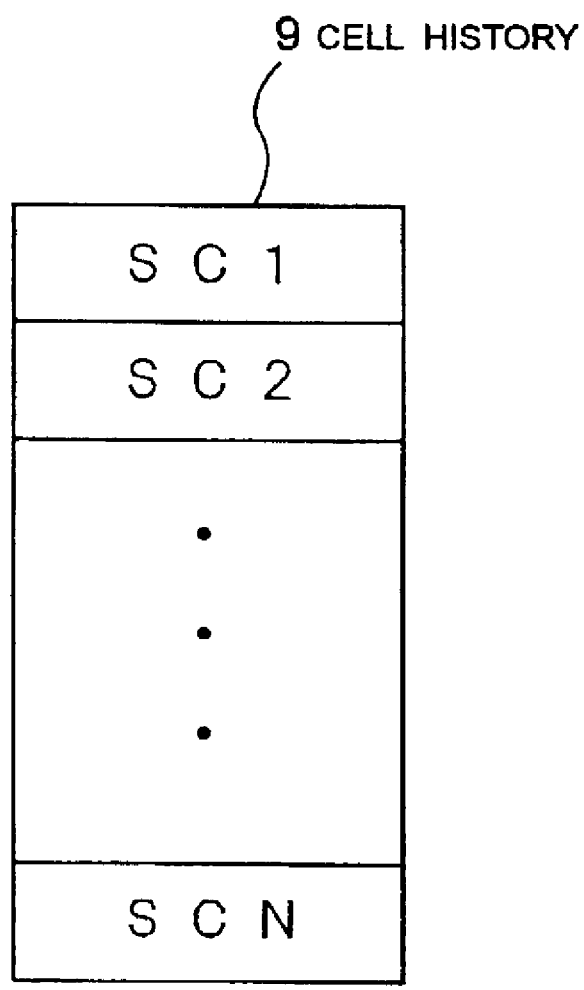
FIG. 3 is a diagram showing a configuration example of a cell history as shown in FIG. 2.

FIG. 3 is a diagram showing a configuration example of the cell history 9 as shown in FIG. 2. In FIG. 3, N SCs are stored in areas SC1 to SCN (N is an integer of 2 or greater) of the cell history 9. These N SCs indicate N cells where the UE 1 has resided before. Herein, N is settable in a non-volatile area of the memory 8. The SC indicating the cell to which the UE 1 has transferred through the zone transfer processing is written in sequence from the area SC1, and if more than N SCs are written, the oldest SC is deleted every time of writing the new one. That is, the SC stored in the area SC1 is deleted, the SC stored in the area SC2 is restored in the area SC1, and the storage content is carried up in succession. The invention is not limited to this method.

In FIG. 2, the CR counter 10 counts the CR instruction from the CR instruction generating portion 7 under the control of the control circuit 2. The control circuit 2 suppresses the zone transfer processing by referring to the cell history 9 in response to the CR instruction from the CR instruction generating portion 7, and performs the zone transfer processing irrespective of the contents of the cell history 9, if the count value of the CR counter 10 reaches a maximum CR instruction frequency value.

Figure 4:
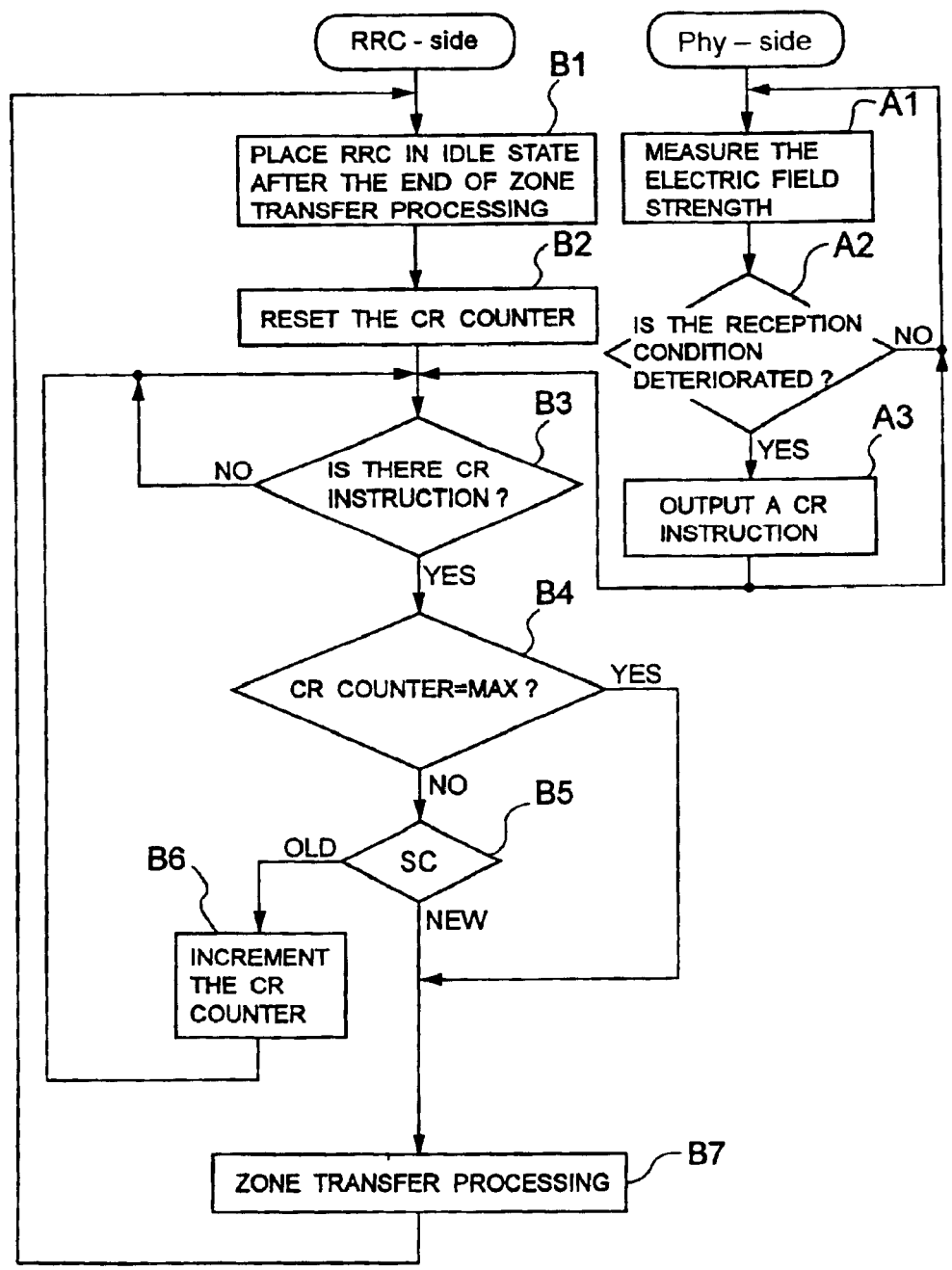
FIG. 4 is a flowchart for explaining the operation of the user equipment as shown in FIG. 2.

The operation of the User Equipment according to the first embodiment of the invention will be described below with reference to the drawings. FIG. 4 is a flowchart for explaining the operation of the User Equipment as shown in FIG. 2. Phy-side (Physical-Side) corresponds to a layer 1 (physical layer) of the UE 1 and manages the radio resources. Also, RRC-side (Radio Resource Control-Side) corresponds to a layer 3 (network layer) of the UE 1, and performs the radio control.

In FIGS. 1, 2 and 4, the electric field strength measuring portion 6 measures the electric field strength of the received signal from the BTS 20 of the cell 200 in which the UE 1 exists, and outputs the measured electric field strength to the CR instruction generating portion 7 (step A1). The CR instruction generating portion 7 monitors the measured electric field strength. If the CR instruction generating portion 7 detects a deterioration in the field strength of the received signal from the BTS 20 (step A2, Yes), it generates and outputs a CR instruction (step A3). And the procedure returns to step A1 again. At step A2, if there is no deterioration in the field strength of the received signal from the BTS 20 (step A2, No), the procedure returns to step A1 again without outputting the CR instruction. The above steps A1 to A3 are the operation on the Phy-side for the UE 1.

The RRC-side of the UE 1 is placed in an idle state, after the zone transfer processing at step B7 (step B1). Then, the control circuit 2 resets the count value of the CR counter 10 (step B2). And if the control circuit 2 receives a CR instruction from the CR instruction generating portion 7 at step A3 (step B3, Yes), the procedure goes to step B4 to determine whether to perform or suppress the zone transfer processing. Also, if there is no CR instruction (step B3, No), the control circuit 2 waits till the CR instruction is received, because it is unnecessary to perform the zone transfer processing.

At step B4, the control circuit 2 compares the count value of the CR counter 10 with the maximum CR instruction frequency value ("MAX"), and if the count value is smaller than the maximum CR instruction frequency value (step B4, No), it refers to the cell history 9 (step B5). Also, if the count value of the CR counter 10 reaches the maximum CR instruction frequency value (step B4, Yes), the control circuit 2 performs the zone transfer processing without referring to the cell history 9 (step B7). The maximum CR instruction frequency value is settable in the non-volatile area of the memory 8.

At step B5, the control circuit 2 compares the SC indicating the cell (transferred cell) to be selected in the zone transfer processing among the SCs detected by the SC detecting portion 5 with each of the SCs stored in the cell history 9 successively. And if the SC indicating the transferred cell is in the cell history 9, namely, the transferred cell is the cell (OLD CELL) in which the UE 1 has existed before (step B5, OLD), the control circuit 2 increments the count value of the CR counter 10 (step B6), and the procedure returns to step B3.

On one hand, if the SC indicating the transferred cell is not in the cell history 9, namely, the transferred cell is the cell (NEW CELL) other than those in which the UE 1 has existed before (step B5, NEW), the control circuit 2 performs the zone transfer processing (step B7). At step B7, the control circuit 2 selects the transferred cell from among the cells which the SCs detected by the SC detecting portion 5 indicate, switches the cell with which the UE 1 communicates from the cell 200 to the transferred cell, and then writes the SC indicating the transferred cell in the cell history 9 as the latest history. In the zone transfer processing at step B7, if the Location Area (LA) in which the UE 1 exists is changed by the transfer to the transferred cell, the location registration processing is performed. After the zone transfer processing at step B7 is performed, the procedure returns to step B1 again.

In this way, the UE 1 according to the first embodiment of the invention holds the history 9 of the cells where the UE 1 has resided before, and determines whether or not the transferred cell is in the history 9 in response to a CR instruction. Then, if the transferred cell is in the history 9, the zone transfer processing for transferring to the transferred cell is suppressed. Further, the CR counter 10 counts the number of generating the CR instruction from the CR instruction generating portion 7, in which if the count value of the CR counter 10 reaches a predetermined value, the zone transfer processing is performed irrespective of the contents of the history 9. Thereby, the zone transfer processing is effectively suppressed, and consequently it is possible to suppress the repetition of location registration near the boundary between LAs. Therefore, it is possible to prevent the location registration traffic from increasing.

Figure 5:
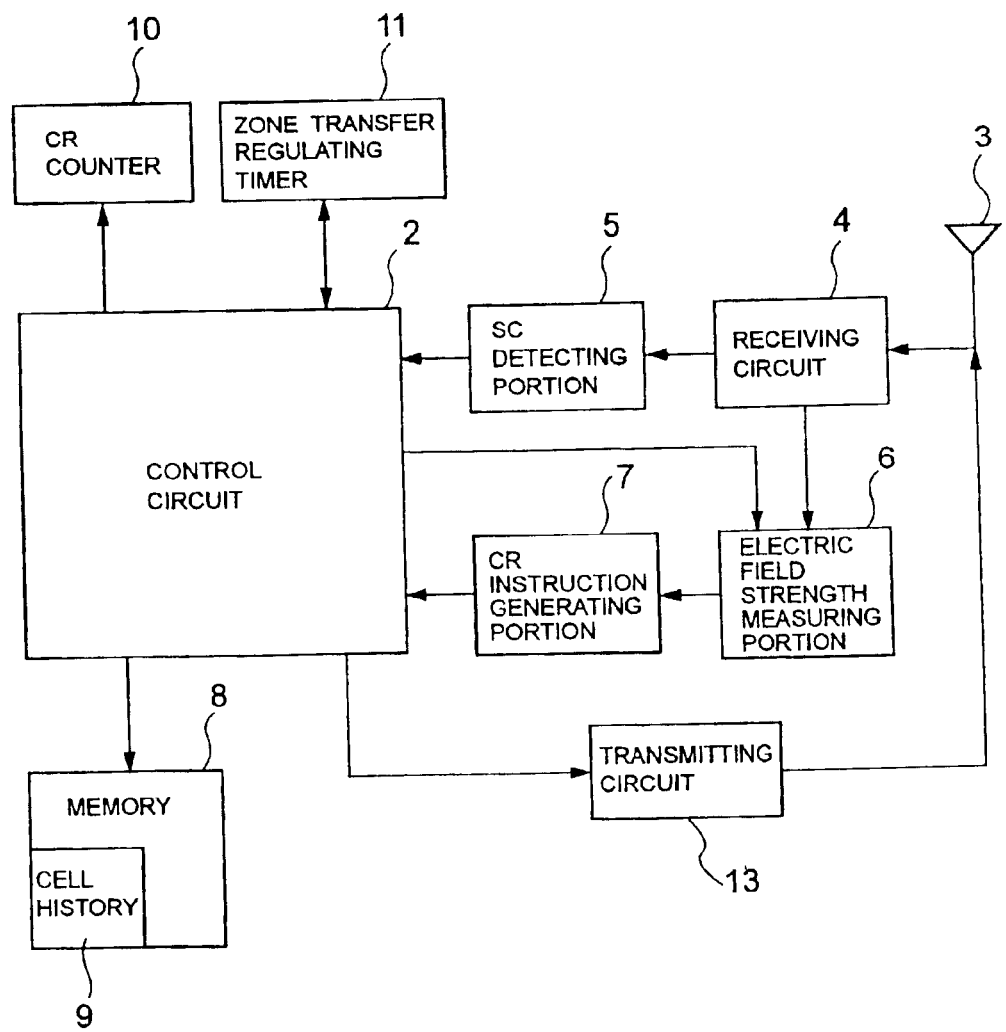
FIG. 5 is a functional block diagram showing the configuration of a user equipment according to a second embodiment of the invention.

A User Equipment according to a second embodiment of the invention will be described below with reference to the drawings. FIG. 5 is a functional block diagram showing the configuration of the User Equipment according to the second embodiment of the invention, in which the same or like parts are designated by the same numerals as in FIG. 2. The User Equipment as shown in FIG. 5 is employed in the mobile communications system as shown in FIG. 1, and it is the UE 1 as shown in FIG. 1.

In FIG. 5, the UE 1 comprises a control circuit 2, an antenna 3, a receiving circuit 4, an SC detecting portion 5, an electric field strength measuring portion 6, a CR instruction generating portion 7, a memory 8, a CR counter 10, a zone transfer regulating timer 11, and a transmitting circuit 13. That is, the UE 1 as shown in FIG. 5 has the zone transfer regulating timer 11, in addition to the User Equipment according to the first embodiment of the invention as shown in FIG. 2.

The zone transfer regulating timer 11 clocks a predetermined time (timer value [msec]) under the control of the control circuit 2, and notifies the elapse of predetermined time to the control circuit 2, when the timer is expired. The timer value is greater than Tselection in the CR instruction generating portion 7, and settable in a non-volatile area of the memory 8. While the zone transfer regulating timer 11 clocks the predetermined time, namely, while the zone transfer regulating timer 11 is operating, the control circuit 2 suppresses the zone transfer processing in accordance with the count value of the CR counter 10 and the cell history 9, upon receiving a CR instruction from the CR instruction generating portion 7. The control circuit 2 clears the contents of the cell history 9 within the memory 8 in response to the notification from the zone transfer regulating timer 11.

Figure 6:
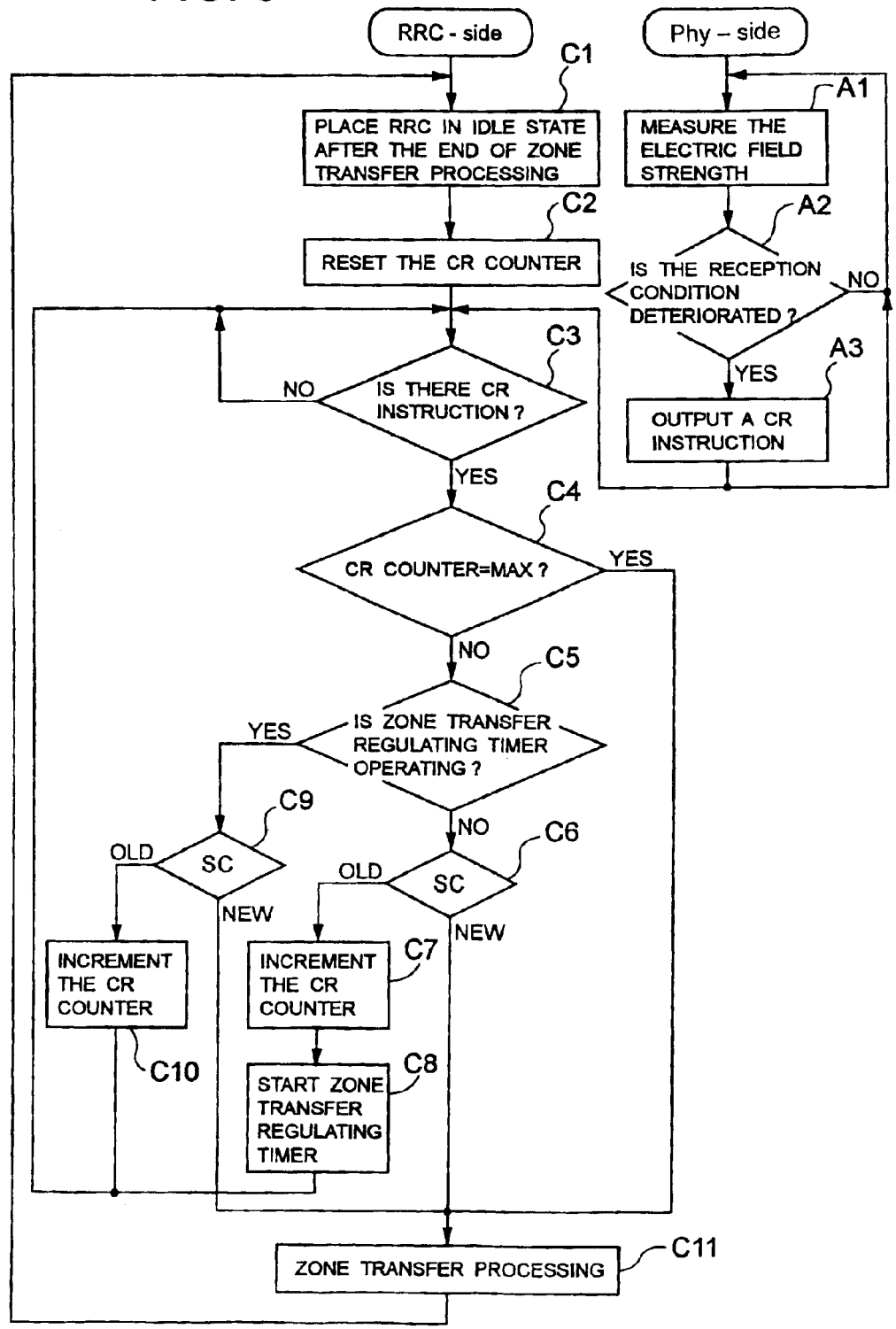
FIG. 6 is a flowchart for explaining the operation of the user equipment as shown in FIG. 5.

The operation of the User Equipment according to the second embodiment of the invention will be described below with reference to the drawings. FIG. 6 is a flowchart for explaining the operation of the User Equipment as shown in FIG. 5. In FIGS. 1, 5 and 6, Phy-side of the UE 1 performs the operation at steps A1 to A3, like Phy-side of the User Equipment according to the first embodiment of the invention.

RRC-side of the UE 1 is placed in an idle state (step C1) after the zone transfer processing at step C11. Then, the control circuit 2 resets the count value of the CR counter 10 (step C2). And if the control circuit 2 receives a CR instruction from the CR instruction generating portion 7 at step A3 (step C3, Yes), the procedure goes to step C4 to determine whether to perform or suppress the zone transfer processing. Also, if there is no CR instruction (step C3, No), the control circuit 2 waits till the CR instruction is received, because it is unnecessary to perform the zone transfer processing.

At step C4, the control circuit 2 compares the count value of the CR counter 10 with the maximum CR instruction frequency value ("MAX"). If the count value of the CR counter 10 reaches the maximum CR instruction frequency value (step C4, Yes), the control circuit 2 performs the zone transfer processing (step C11). Also, if the count value of the CR counter 10 is smaller than the maximum CR instruction frequency value (step C4, No), the control circuit 2 determines whether or not the zone transfer regulating timer 11 is operating (step C5).

If the zone transfer regulating timer 11 is stopped (step C5, No), the control circuit 2 compares the SC indicating the cell (transferred cell) to be selected in the zone transfer processing among the SCs detected by the SC detecting portion 5 with each of the SCs stored in the cell history 9 successively (step C6). And if the SC indicating the transferred cell is in the cell history 9, namely, the transferred cell is the cell (OLD CELL) in which the UE 1 has existed before (step C6, OLD), the control circuit 2 increments the count value of the CR counter 10 (step C7), and starts the zone transfer regulating timer 11 (step C8). Then, the procedure returns to step C3.

If the SC indicating the transferred cell is not in the cell history 9, namely, the transferred cell is the cell (NEW CELL) other than those in which the UE 1 has existed before (step C6, NEW), the control circuit 2 performs the zone transfer processing (step C11).

At step C5, if the zone transfer regulating timer 11 is operating (step C5, Yes), the control circuit 2 refers to the cell history 9, like step C6 (step C9). If the SC indicating the transferred cell is in the cell history 9 (step C9, OLD), the control circuit 2 increments the count value of the CR counter 10 (step C10), and the procedure returns to step C3.

If the SC indicating the transferred cell is not in the cell history 9 (step C9, NEW), the control circuit 2 performs the zone transfer processing (step C11). At step C11, the control circuit 2 selects the transferred cell from among the cells which the SCs detected by the SC detecting portion 5 indicate, switches the cell with which the UE 1 communicates from the cell 200 to the transferred cell, and then writes the SC indicating the transferred cell in the cell history 9 as the latest history. In the zone transfer processing at step C11, if the LA in which the UE 1 exists is changed by the transfer to the transferred cell, the location registration processing is performed. After the zone transfer processing at step C11 is performed, the procedure returns to step C1 again.

After the zone transfer regulating timer 11 is started under the control of the control circuit 2 at step C8, the zone transfer regulating timer 11 continues to count, but if the predetermined time (timer value) is reached, it notifies the expiration of the timer to the control circuit 2. Then, the control circuit 2 clears the contents of the cell history 9 in response to this notification from the zone transfer regulating timer 11. Accordingly, the control circuit 2 determines that the transferred cell is other than the cells in which the UE 1 has existed before at step C6 following steps C3 to C5 after the timer is expired, because the SC is not stored in the cell history 9, and performs the zone transfer processing, whereby the SC indicating the transferred cell is written in the cell history 9 (step C11).

In this way, the UE 1 according to the second embodiment of the invention has the zone transfer regulating timer 11, in addition to the configuration according to the first embodiment of the invention. If the transferred cell is the cell (OLD CELL) in which the UE 1 has existed before even when there is a CR instruction during the operation of this timer, the zone transfer processing is suppressed till the count value of the CR counter 10 reaches the predetermined value ("MAX" in FIG. 6), and is performed only if this predetermined value is reached. However, if the transferred cell is the NEW CELL during the operation of the timer 11, the zone transfer processing is immediately performed. And if the timer reaches the predetermined time, the timer operation is stopped, and the contents of the cell history 9 is deleted. Thereby, the zone transfer processing is effectively suppressed, and consequently it is possible to suppress the repetition of location registration near the boundary between LAs. Therefore, it is possible to prevent the location registration traffic from increasing.

In the User Equipment according to each of the first and second embodiments of the invention, in the case where there is a single SC detected by the SC detecting portion 5 at the time of the occurrence of a CR instruction, when the zone transfer processing is regulated, the link is disconnected, if the UE gets out of the present cell. Accordingly, in the case where there is a single SC detected by the SC detecting portion 5 at the time of the occurrence of a CR instruction, the zone transfer processing may not be suppressed for safety.

The mobile communications system as shown in FIG. 1 may employ an Hierarchical Cell Structure (HCS) on the side of a network, not shown. This HCS method is one in which the network gives a level of priority to the cell, whereby the User Equipment is suppressed to transfer from one cell having higher level of priority to the other cell. In the case where the HCS method is employed, with the same method for suppressing the zone processing of transfer to be performed by the User Equipment according to each of the first and second embodiments of the invention in which the HCS method is not employed, the User Equipment tries to reside in the present cell more than necessary, so that the link is disconnected with high possibility. Therefore, it is required to set the maximum CR instruction frequency value of the CR counter 10 and the timer value of the zone transfer regulating timer 11 (only the maximum CR instruction frequency value for the User Equipment according to the first embodiment of the invention) in accordance with the use of the HCS method.

Figure 7:
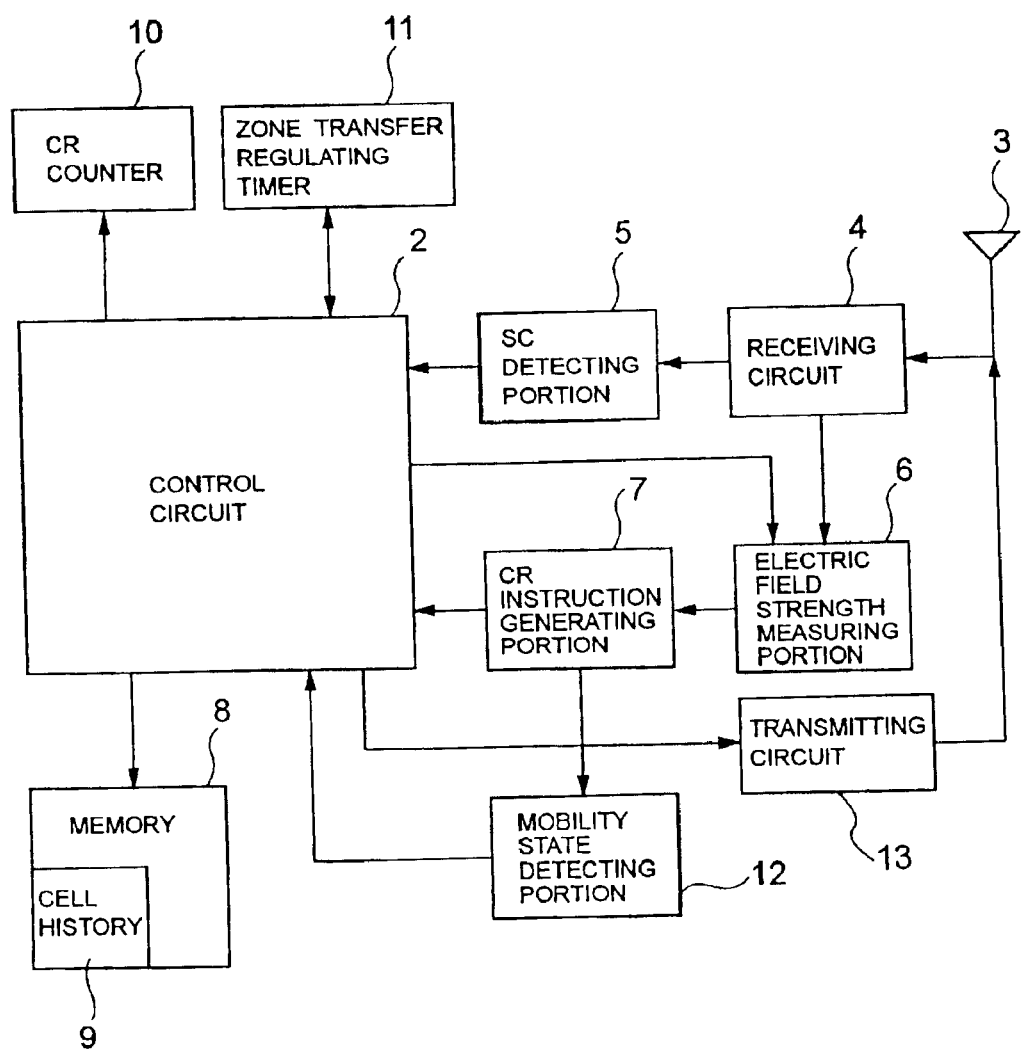
FIG. 7 is a functional block diagram showing the configuration of a user equipment according to a third embodiment of the invention.

A User Equipment according to a third embodiment of the invention will be described below with reference to the drawings. FIG. 7 is a functional block diagram showing the configuration of the User Equipment according to the third embodiment of the invention, in which the same or like parts are designated by the same numerals as in FIG. 5. The User Equipment as shown in FIG. 7 is employed in the mobile communications system as shown in FIG. 1, and it is the UE 1 as shown in FIG. 1.

In FIG. 7, the UE 1 comprises a control circuit 2, an antenna 3, a receiving circuit 4, an SC detecting portion 5, an electric field strength measuring portion 6, a CR instruction generating portion 7, a memory 8, a CR counter 10, a zone transfer regulating timer 11, a mobility state detecting portion 12, and a transmitting circuit 13. That is, the UE 1 as shown in FIG. 7 has the mobility state detecting portion 12, in addition to the User Equipment according to the second embodiment of the invention as shown in FIG. 5.

The CR instruction generating portion 7 outputs a generated CR instruction to the control circuit 2, and the mobility state detecting portion 12. The mobility state detecting portion 12 discriminates whether the mobility state of the UE 1 is a High-mobility state or a Low-mobility state depending on the frequency of the CR instruction from the CR instruction generating portion 7, and notifies the discriminated mobility state to the control circuit 2. More specifically, the mobility state detecting portion 12 recognizes that the UE 1 is in the High-mobility state if the frequency of the CR instruction (the number of generating the CR instruction within a certain time period) from the CR instruction generating portion 7 is great, or recognizes that the UE 1 is in the Low-mobility state if the frequency of the CR instruction is small.

In the memory 8, the maximum CR instruction frequency value of the CR counter 10 and the timer value of the zone transfer regulating timer 11 for use when the UE 1 is in the High-mobility state are stored. Also, in the memory 8, the maximum CR instruction frequency value of the CR counter 10 and the timer value of the zone transfer regulating timer 11 for use when the UE 1 is in the Low-mobility state are stored.

Accordingly, the control circuit 2 reads the maximum CR instruction frequency value and the timer value for the High-mobility state that are stored in the memory 8, if the mobility state notified from the mobility state detecting portion 12 is the High-mobility state, whereby the maximum value of the CR counter 10 is set to the maximum CR instruction frequency value, and the timer value is clocked by the zone transfer regulating timer 11. Also, the control circuit 2 reads the maximum CR instruction frequency value and the timer value for the Low-mobility state that are stored in the memory 8, if the mobility state notified from the mobility state detecting portion 12 is the Low-mobility state, whereby the maximum value of the CR counter 10 is set to the maximum CR instruction frequency value, and the timer value is clocked by the zone transfer regulating timer 11.

The operation of the UE 1 is the same as for the User Equipment according to the second embodiment of the invention, except that the maximum CR instruction frequency value and the timer value are set in accordance with the mobility state of the UE 1. The maximum CR instruction frequency value and the timer value for each of the High-mobility state and the Low-mobility state are set at the optimal values, depending on various conditions of the actual network where the UE 1 is operated.

As described above, in the UE 1 according to the third embodiment of the invention, the maximum CR instruction frequency value and the timer value are set in accordance with the mobility state of the UE 1, and the zone transfer processing is suppressed, using the cell history 9, the CR counter 10 and the zone transfer regulating timer 11. Thereby, the zone transfer processing is effectively suppressed in accordance with the mobility state of the UE 1, and consequently it is possible to suppress the repetition of location registration near the boundary between LAs. Therefore, it is possible to prevent the location registration traffic from increasing.

The processing operation of each flowchart as shown in FIGS. 4 and 6 can be performed by a program stored in the recording medium such as the ROM that is read and executed by the computer comprising the CPU (control unit).

Suppressing control means for the User Equipment according to the invention suppresses the transfer processing from the present cell to the other cell by referring to the history of cells in which the UE has existed before in response to a cell selection instruction. Thereby, the location registration processing is suppressed and consequently it is possible to suppress the repetition of location registration.

Also, the suppressing control means performs the transfer processing, irrespective of the contents of the history, if the cell selection instruction is issued by a predetermined number of times, and further suppresses the transfer processing based on the number of the cell selection instruction within a predetermined time period and the history, by adding the time parameter, thereby suppressing more effectively the transfer processing.

What is claimed is:

1. A mobile communication system for code division multiple access communication, said system comprising a mobile station and a plurality of base stations, each base station comprising a plurality of cells, the mobile station communicating through a cell of one of the base stations, wherein said mobile station comprises a suppression control section for suppressing transferring of the mobile station to a different cell selected by a transfer process in accordance with a history of cells in which said mobile station has existed before, when a cell selection instruction is issued.

2. The mobile communication system according to claim 1, wherein said suppression control section suppresses the transfer process, if the transferred cell lies in the history.

3. The mobile communication system according to claim 2, wherein said suppression control section performs the transfer process, if the cell selection instruction is issued a predetermined number of times.

4. The mobile communication system according to claim 3, wherein said suppression control section comprises a counting unit for counting the cell selection instruction, and said suppression control section controls the transfer process in accordance with a comparison result that is obtained by comparing a count value of said counting unit and the predetermined number of times.

5. The mobile communication system according to claim 3, wherein the predetermined number of times comprises a value corresponding to the frequency of the cell selection instruction.

6. A mobile communication system for code division multiple access communication, said system comprising a mobile station and a plurality of base stations, each base station comprising a plurality of cells, the mobile station communicating through a cell of one of the base stations, wherein said mobile station comprises a suppression control section for suppressing transferring of the mobile station to a different cell selected by a transfer process in accordance with the number of times a cell selection instruction has been issued within a predetermined time period and a history of cells in which said mobile station has existed before.

7. The mobile communication system according to claim 6, wherein said suppression control section suppresses the transfer process until the number of times the cell selection instruction has been issued reaches a predetermined number, if the transferred cell lies in the history at the time the cell selection instruction is issued within the predetermined time period.

8. The mobile communication system according to claim 7, wherein said suppression control section performs the transfer process if the number of times the cell selection instruction has been issued reaches the predetermined number of times.

9. The mobile communication system according to claim 7, wherein said suppression control section directly makes the transfer process if the transferred cell does not lie in the history at the time the cell selection instruction is issued within the predetermined time period.

10. The mobile communication system according to claim 6, wherein said suppression control section initializes the history after the elapse of the predetermined time period.

11. The mobile communication system according to claim 6, wherein said suppression control section comprises a clock unit for timing the predetermined time period, and starts said clock unit when the transfer process is suppressed.

12. The mobile communication system according to claim 7, wherein the predetermined time period and the predetermined number of times are based on values corresponding to the frequency of the cell selection instruction.

13. The mobile communication system according to claim 1, wherein said suppression control section comprises a cell selection instruction generating unit for generating the cell selection instruction by detecting deterioration in a received signal from the base station of a cell in which said mobile station exists at present.

14. A mobile station for use in a mobile communication system for code division multiple access communication, wherein the system comprises said mobile station and a plurality of base stations, each base station comprises a plurality of cells, and said mobile station communicates through a cell of one of the base stations, said mobile station comprising a suppression control section for suppressing transferring of said mobile station to a different cell selected by a transfer process in accordance with a history of cells in which said mobile station has existed before, when a cell selection instruction is issued.

15. The mobile station according to claim 14, wherein said suppression control section suppresses the transfer process, if the transferred cell lies in the history.

16. The mobile station according to claim 15, wherein said suppression control section performs the transfer process, if the cell selection instruction is issued a predetermined number of times.

17. The mobile station according to claim 16, wherein said suppression control section comprises a counting unit for counting the cell selection instruction, and said suppression control section controls the transfer process in accordance with a comparison result that is obtained by comparing a count value of said counting unit and the predetermined number of times.

18. The mobile station according to claim 16, wherein the predetermined number of times comprises a value corresponding to the frequency of the cell selection instruction.

19. A mobile station for use in a mobile communication system for code division multiple access communication, wherein the system comprises said mobile station and a plurality of base stations, each base station comprises a plurality of cells, and said mobile station communicates through a cell of one of the base stations, said mobile station comprising a suppression control section for suppressing transferring of said mobile station to a different cell selected by a transfer process in accordance with the number of times a cell selection instruction has been issued within a predetermined time period and a history of cells in which said mobile station has existed before.

20. The mobile station according to claim 19, wherein said suppression control section suppresses the transfer process until the number of times the cell selection instruction has been issued reaches a predetermined number, if the transferred cell lies in the history at the time the cell selection instruction is issued within the predetermined time period.

21. The mobile station according to claim 20, wherein said suppression control section performs the transfer process if the number of times the cell selection instruction has been issued reaches the predetermined number of times.

22. The mobile station according to claim 20, wherein said suppression control section directly makes the transfer process if the transferred cell does not lie in the history at the time the cell selection instruction is issued within the predetermined time period.

23. The mobile station according to claim 19, wherein said suppression control section initializes the history after the elapse of the predetermined time period.

24. The mobile station according to claim 19, wherein said suppression control section comprises a clock unit for timing the predetermined time period, and starts said clock unit when the transfer process is suppressed.

25. The mobile station according to claim 20, wherein the predetermined time period and the predetermined number of times are based on values corresponding to the frequency of the cell selection instruction.

26. The mobile station according to claim 14, wherein said suppression control section comprises a cell selection instruction generating unit for generating the cell selection instruction by detecting deterioration in a received signal from the base station of a cell in which said mobile station exists at present.

27. A control method for a mobile station in a mobile communication system for code division multiple access communication, wherein the system comprises the mobile station and a plurality of base stations, each base station comprises a plurality of cells, and the mobile station communicates through a cell of one of the base stations, the method comprising suppressing transferring of the mobile station to a different cell selected by a transfer process in accordance with a history of cells in which said mobile station has existed before, when a cell selection instruction is issued.

28. The control method according to claim 27, wherein the transfer process is suppressed if the transferred cell lies in the history.

29. The control method according to claim 28, wherein the transfer process is performed if the cell selection instruction is issued a predetermined number of times.

30. The control method according to claim 29, wherein performing the transfer process comprises counting the cell selection instruction, and controlling the transfer process in accordance with a comparison result that is obtained by comparing a count value of the counting and the predetermined number of times.

31. The control method according to claim 29, wherein the predetermined number of times comprises a value corresponding to the frequency of the cell selection instruction.

32. A control method for a mobile station in a mobile communication system for code division multiple access communication, wherein said system comprises the mobile station and a plurality of base stations, each base station comprises a plurality of cells, and the mobile station communicates through a cell of one of the base stations, the method comprising suppressing transferring of the mobile station to a different cell selected by a transfer process in accordance with the number of times a cell selection instruction has been issued within a predetermined time period and a history of cells in which said mobile station has existed before.

33. The control method according to claim 32, wherein the transfer process is suppressed until the number of times the cell selection instruction has been issued reaches a predetermined number, if the transferred cell lies in the history at the time the cell selection instruction is issued within the predetermined time period.

34. The control method according to claim 33, further comprising performing the transfer process if the number of times the cell selection instruction has been issued reaches the predetermined number of times.

35. The control method according to claim 33, further comprising directly making the transfer process if the transferred cell does not lie in the history at the time the cell selection instruction is issued within the predetermined time period.

36. The control method according to claim 32, further comprising initializing the history after the elapse of the predetermined time period.

37. The control method according to claim 32, further comprising timing the predetermined time period, starting when the transfer processing is suppressed.

38. The control method according to claim 33, wherein the predetermined time period and the predetermined number of times are based on values corresponding to the frequency of the cell selection instruction.

39. The control method according to claim 27, further comprising generating the cell selection instruction by detecting deterioration in a received signal from the base station of a cell in which said mobile station exists at present.

40. A recording medium storing a program that is to be executed on a computer to implement a control method for a mobile station in a mobile communication system for code division multiple access communication, wherein the system comprises the mobile station and a plurality of base stations, each base station comprises a plurality of cells, and the mobile station communicates through a cell of one of the base stations, said method comprising a suppressing transferring of the mobile station to a different cell selected by a transfer process in accordance with a history of cells in which said mobile station has existed before, when a cell selection instruction is issued.

41. The recording medium according to claim 40, wherein the method suppresses the transfer process if the transferred cell lies in the history.

42. The recording medium according to claim 41, wherein the method further comprises performing the transfer process if the cell selection instruction is issued a predetermined number of times.

43. The recording medium according to claim 42, wherein said transfer process comprises counting the cell selection instruction, and controlling the transfer process in accordance with a comparison result that is obtained by comparing a count value of the counting and the predetermined number of times.

44. The recording medium according to claim 42, wherein the predetermined number of times comprises a value corresponding to the frequency of the cell selection instruction.

45. A recording medium storing a program that is to be executed on a computer to implement a control method for a mobile station in a mobile communication system for code division multiple access communication, wherein the system comprises the mobile station and a plurality of base stations, each base station comprises a plurality of cells, and the mobile station communicates through a cell of one of the base stations, said method comprising suppressing transferring of the mobile station to a different cell selected by a transfer process in accordance with the number of times a cell selection instruction has been issued within a predetermined time period and a history of cells in which said mobile station has existed before.

46. The recording medium according to claim 45, wherein the method suppresses the transfer process until said the number of times the cell selection instruction has been issued reaches a predetermined number, if the transferred cell lies in the history at the time the cell selection instruction is issued within the predetermined time period.

47. The recording medium according to claim 46, wherein the method further comprises performing the transfer process if the number of times the cell selection instruction has been issued reaches the predetermined number of times.

48. The recording medium according to claim 46, wherein the method further comprises directly making the transfer process if the transferred cell does not lie in the history at the time the cell selection instruction is issued within the predetermined time period.

49. The recording medium according to claim 45, wherein the method further comprises initializing the history after the elapse of the predetermined time period.

50. The recording medium according to claim 45, wherein the method further comprises timing the predetermined time period, starting when the transfer processing is suppressed.

51. The recording medium according to claim 46, wherein the predetermined time period and the predetermined number of times are based on values corresponding to the frequency of the cell selection instruction.

52. The recording medium according to claim 40, wherein the method further comprises generating the cell selection instruction by detecting deterioration in a received signal from the base station of a cell in which said mobile station exists at present.

* * * * *